United States Patent
Burger et al.

(10) Patent No.: US 9,606,836 B2
(45) Date of Patent: Mar. 28, 2017

(54) INDEPENDENTLY NETWORKABLE HARDWARE ACCELERATORS FOR INCREASED WORKFLOW OPTIMIZATION

(71) Applicant: Microsoft Technology Licensing, LLC, Redmond, WA (US)

(72) Inventors: Douglas Christopher Burger, Bellevue, WA (US); Adrian M. Caulfield, Woodinville, WA (US); Eric S. Chung, Woodinville, WA (US); Andrew R. Putnam, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/735,108

(22) Filed: Jun. 9, 2015

(65) Prior Publication Data

US 2016/0364271 A1 Dec. 15, 2016

(51) Int. Cl.
*G06F 9/46* (2006.01)
*G06F 9/50* (2006.01)

(52) U.S. Cl.
CPC ............ *G06F 9/5027* (2013.01); *G06F 9/505* (2013.01)

(58) Field of Classification Search
None
See application file for complete search history.

(56) References Cited

U.S. PATENT DOCUMENTS 8,910,103 B2 12/2014 Campi et al.
2012/0054771 A1* 3/2012 Krishnamurthy ..... G06F 9/4881
718/105

2013/0007762 A1 1/2013 Krishnamurthy
2014/0056302 A1 2/2014 Benny et al.
2014/0079016 A1* 3/2014 Dai ....................... H04L 5/0041
370/330

(Continued)

OTHER PUBLICATIONS

Lu, et al., "Using CPU as a Traffic Co-processing Unit in Commodity Switches", In Proceedings of Hot Topics in Software Defined Networking, Aug. 13, 2012, 6 pages.

(Continued)

*Primary Examiner* — Sisley Kim
(74) *Attorney, Agent, or Firm* — The Watson IP Group, PLC; Vladan M. Vasiljevic

(57) ABSTRACT

Specialized processing devices comprise both processing circuitry that is pre-configured to perform a discrete set of computing operations more quickly than generalized central processing units and network transport circuitry that communicationally couples each individual specialized processing device to a network as its own unique network client. Requests for hardware acceleration from workflows being executed by generalized central processing units of server computing devices are directed to hardware accelerators in accordance with a table associating available hardware accelerators with the computing operations they are optimized to perform. Load balancing, as well as dynamic modifications in available hardware accelerators, is accomplished through updates to such a table. The portion of the workflow to be hardware accelerators is packetized and provided to such hardware accelerators, including via network communications to specialized processing devices that comprise network transport circuitry and act as their own unique network clients.

20 Claims, 4 Drawing Sheets

(56) References Cited

U.S. PATENT DOCUMENTS

2014/0229630 A1  8/2014  Narayanan et al.
2015/0103837 A1* 4/2015  Dutta .................... H04L 47/125
                                                         370/401

OTHER PUBLICATIONS

"Accelerating UTM with Specialized Hardware", In Fortinet White Paper, Jul. 27, 2011, 9 pages.
Makita, et al., "Hardware Accelerating Linux Network Functions", In Proceedings of Technical Conference on Linux Networking, Feb. 14, 2015, 2 pages.
"HP FlexFabric Reference Architecture Overview", In Technical White Paper, Nov. 19, 2012, 17 pages.
Liang, et al., "NetComposer-II: High performance Structured ASIC Programmable NPU platform for layer 4-7 applications", Published on: May 8, 2012 Available at: http://www.design-reuse.com/articles/9611/netcomposer-ii-high-performance-structured-asic-programmable-npu-platform-for-layer-4-7-applications.html.
"Accelerating SDN Monitoring Networks in Enterprise Data Centers", Retrieved on: Feb. 23, 2015 Available at: http://www.bigswitch.com/sites/default/files/file_attach/dell-bsn_joint_solution_brief_2pager.pdf.
Bachar, et al., "Introducing "Wedge" and "FBOSS," the Next Steps Toward a Disaggregated Network", Published on: Jun. 18, 2014 Available at: https://code.facebook.com/posts/681382905244727/introducing-wedge-and-fboss-the-next-steps-toward-a-disaggregated-network/.
Luo, et al., "Accelerated Virtual Switching with Programmable NICs for Scalable Data Center Networking", In Proceedings of the Second ACM SIGCOMM Workshop on Virtualized Infrastructure Systems and Architectures, Sep. 9, 2010, 8 pages.
"Family 8721+01 IBM Flex System Enterprise Chassis", Retrieved on: Feb. 23, 2015 Available at: http://www-01.ibm.com/common/ssi/printableversion.wss?docURL=/common/ssi/rep_sm/1/877/ENUS8721-_h01/index.html.
"Cisco Nexus 5548P Switch Architecture", In Cisco White Paper, Retrieved on: Feb. 23, 2015, 13 pages.
"Delivering HPC Applications with Juniper Networks and Chelsio Communications", In White Paper of Juniper Networks, Aug. 2011, 9 pages.
Ha, et al., "ASIC Design of IPSec Hardware Accelerator for Network Security", In Proceedings of IEEE Asia-Pacific Conference on Advanced System Integrated Circuits, Aug. 4, 2004, 4 pages.
"International Search Report and Written Opinion Issued in PCT Application No. PCT/US2016/036273", Mailed Date: Aug. 31, 2016, 13 Pages.

* cited by examiner

INDEPENDENTLY NETWORKABLE HARDWARE ACCELERATORS FOR INCREASED WORKFLOW OPTIMIZATION

BACKGROUND

Modern computer networking hardware enables physically separate computing devices to communicate with one another orders of magnitude faster than was possible with prior generations of networking hardware. Consequently, it has become more practical to perform digital data processing at locations remote from the user requesting such processing, or on whose behalf such processing is being performed. Large quantities of data processing capability are being aggregated into centralized locations that comprise dedicated hardware and support systems including hundreds or thousands of computing devices, typically mounted in vertically oriented racks. Such a collection of computing devices, as well as the associated hardware necessary to support such computing devices, and the physical structure that houses the computing devices and associated hardware, is traditionally referred to as a "data center". The primary computing devices of a data center are, typically, homogenous so that, in the event of failure, they can be efficiently replaced, thereby providing robustness to the processing capacity and capability of the data center. Such homogeneity is counter to the utilization of specialized, or dedicated, processing devices to accelerate specific computational tasks.

SUMMARY

Specialized processing devices can comprise processing circuitry that is pre-configured to perform a discrete set of computing operations more quickly than generalized central processing units. Each individual specialized processing device can also comprise network transport circuitry that communicationally couples each individual specialized processing device to a network as its own unique network client. Workflows being executed by the generalized central processing units of server computing devices can request that portions of such workflows be executed by hardware accelerators. Reference can be made to a table, or similar data structure, associating available hardware accelerators with the computing operations they are optimized to perform. Load balancing, as well as dynamic modifications in available hardware accelerators, can be accomplished through updates to such a table. Upon identifying one or more available hardware accelerators, the portion of the workflow to be executed by such identified hardware accelerators can be packetized and provided to such hardware accelerators, including via network communications to specialized processing devices that comprise network transport circuitry and act as their own unique network clients. Once such hardware accelerators complete their processing of the portion of the workflow, returned results can be received and stored into memory locations, and pointers to such locations can be returned to the workflow executing on the generalized central processing units, whereby the execution of such a workflow can resume. By utilizing specialized processing devices comprising network transport circuitry enabling such specialized processing devices to act as their own unique network clients, one or more such specialized processing devices can be dynamically added, removed or changed within the context of a data center, thereby enabling a greater breadth of processing to be performed in an accelerated manner, and thereby enabling a greater amount of acceleration, such as through increased utilization of parallel processing, without impacting the desired homogeneity of the server computing devices of the data center.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
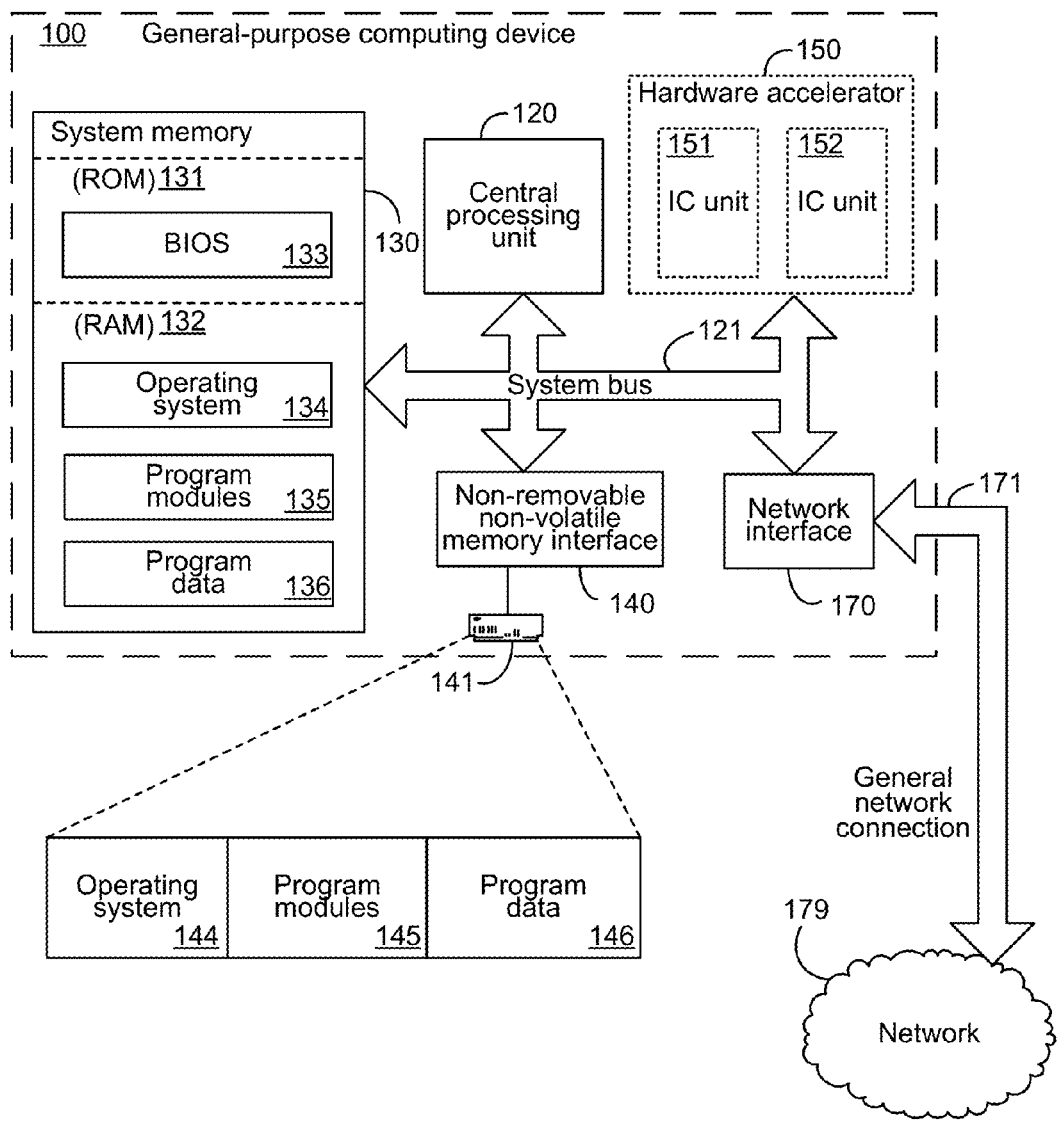
FIG. 1 is a block diagram of an exemplary computing device comprising an exemplary hardware accelerator.

The following description relates to optimizing the processing of workflows in a data center through the use of specialized processing devices that comprise network transport circuitry that enables such specialized processing devices to act as their own unique network clients. Such specialized processing devices can be dynamically added, removed or changed within the data center, thereby enabling a greater breadth of processing to be performed in an accelerated manner, and thereby enabling a greater amount of acceleration, such as through increased utilization of parallel processing, without impacting the desired homogeneity of the server computing devices of the data center. Specialized processing devices can, in addition to the network transport circuitry, also comprise processing circuitry that is pre-configured to perform a discrete set of computing operations more quickly than generalized central processing units. Workflows being executed by the generalized central processing units of server computing devices can request that portions of such workflows be executed by hardware accelerators. Reference can be made to a table, or similar data structure, associating available hardware accelerators with the computing operations they are optimized to perform. Load balancing, as well as dynamic modifications in available hardware accelerators, can be accomplished through updates to such a table. Upon identifying one or more available hardware accelerators, the portion of the workflow to be executed by such identified hardware accelerators can be packetized and provided to such hardware accelerators, including via network communications to specialized processing devices that comprise network transport circuitry and act as their own unique network clients. Once such hardware accelerators complete their processing of the portion of the workflow, returned results can be received and stored into memory locations, and pointers to such locations can be returned to the workflow executing on the generalized central processing units, whereby the execution of such a workflow can resume.

The techniques described herein make reference to hardware accelerators, such as are comprised of customized, typically task-specific, processing circuitry, which traditionally performs specific processing tasks more quickly and efficiently then general-purpose central processing units. However, the mechanisms described are not limited to the specific hardware accelerators described, and can be utilized with any other processing unit, or combinations of multiple processing units, however delineated, that performs computational, or processing, tasks in an accelerated manner.

As utilized herein, the term "hardware accelerator" means any collection of processing circuitry that is specifically optimized to perform a discrete subset of computer processing operations, or execute a discrete subset of computer-executable instructions, in an accelerated manner faster or with more efficient power utilization than such operations would be performed, or such instructions would be executed, by a general-purpose central processing unit that was not so specifically optimized. Consequently, as utilized herein, the adjective "more efficient" means either faster or with more efficient power utilization. Additionally, as utilized herein, the term "processing unit" means a hardware device comprising circuitry capable of executing computer executable instructions.

Although not required, the descriptions below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, servers, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary computing device 100 is illustrated which can perform some or all of the mechanisms and actions described below. The exemplary computing device 100 can include conventional computing hardware, such as will be detailed below, and can optionally include a hardware accelerator, such as the exemplary hardware accelerator 150, illustrated in FIG. 1 via dashed lines to indicate that it is an optional component. As indicated previously, a hardware accelerator comprises processing circuitry that is specifically optimized to perform a discrete subset of computer processing operations, or execute a discrete subset of computer-executable instructions, in an accelerated manner, or with more efficient power utilization, than such operations would be performed, or such instructions would be executed, by a general-purpose, or generalized, central processing unit that was not so specifically optimized, such as, for example, one of the one or more central processing units (CPUs) 120.

For purposes of illustration, the exemplary hardware accelerator 150, shown in FIG. 1, is illustrated as comprising multiple integrated circuits, such as exemplary integrated circuits 151 and 152. Such integrated circuits can include Application-Specific Integrated Circuits (ASICs), Field Programmable Gate Arrays (FPGAs), Graphics Processing Units (GPUs) or other Very Large Scale Integrated circuits (VLSIs). The integrated circuits 151 and 152 of the exemplary hardware accelerator 150 can be specifically optimized to perform a discrete subset of computer processing operations, or execute a discrete subset of computer-executable instructions, in an accelerated manner. For example, the exemplary hardware accelerator 150 can be optimized to perform video compression. As another example, the exemplary hardware accelerator 150 can be optimized to execute specific ranking algorithms, such as within the context of Internet search engines. In instances where the exemplary hardware accelerator 150 is utilized to, for example, execute a compression algorithm and compress a defined set of data, the execution of such a compression algorithm can be passed from the exemplary CPU 120 to the exemplary hardware accelerator 150, thereby leaving the CPU 120 available to perform other processing while the hardware accelerator 150 compresses the defined set of data.

Turning to the rest of the exemplary computing device 100, in addition to the exemplary CPU 120, and the exemplary hardware accelerator 150, the exemplary computing device 100 can further comprise a system memory 130, and a system bus 121 that couples various system components including the system memory to the processing unit 120 and the hardware accelerator 150. The system bus 121 may be any of several types of bus structures including a memory bus or memory controller, a peripheral bus, and a local bus using any of a variety of bus architectures. Depending on the specific physical implementation, one or more of the CPUs 120, the hardware accelerator 150, the system memory 130 and other components of the computing device 100 can be physically co-located, such as on a single chip or silicon die or on a single circuit board. In such a case, some or all of the system bus 121 can be nothing more than silicon pathways within a single chip structure or on a single die and its illustration in FIG. 1 can be nothing more than notational convenience for the purpose of illustration.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media, as defined and delineated above. The hard disk drive 141 is typically connected to the system bus 121 through a nonvolatile memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 may operate in a networked environment using logical connections to one or more remote computers. The computing device 100 is illustrated as being connected to the general network connection 171 through a network interface or adapter 170, which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Although described as a single physical device, the exemplary computing device 100 can be a virtual computing device, in which case the functionality of the above-described physical components, such as the CPU 120, the system memory 130, the network interface 170, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 100 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

According to one aspect, the computing device 100 can be a server computing device within the context of a data center. As indicated previously, within data center contexts, it can be desirable to maintain homogeneity among the server computing devices. For example, homogeneous server computing devices can be efficiently swapped in cases of failure, thereby minimizing the processing impact, on the data center as a whole, of the failure of any one server computing device. To maintain homogeneity, a local hardware accelerator, such as the exemplary hardware accelerator 150, can be a hardware accelerator that can be reconfigured such that the processing performable by such a hardware accelerator 150, in an accelerated manner, can be changed. For example, the hardware accelerator 150 can comprise one or more FPGAs. As will be recognized by those skilled in the art, FPGAs can be reconfigured, but they can consume greater power, and can process certain computer executable instructions more slowly than hardware accelerators that are not reconfigurable and which are physically constructed to perform specific functionality. For example, ASICs designed for a particular task, or configured to execute a specific subset of computer-executable instructions, will typically perform such a task, and execute such computer executable instructions more quickly and more efficiently than FPGAs. Consequently, it can be desirable, for tasks that are performed often, or which are processing intensive, to offload such tasks to dedicated, fixed-function hardware accelerators, such as ASICs. However, including such dedicated, fixed-function hardware accelerators with only certain server computing devices violates the advantageous homogeneity described above, and including them with all server computing devices can be expensive and inefficient.

The mechanisms described below advantageously enable the addition of fixed-function hardware accelerators to a data center without negatively impacting the advantages achieved by maintaining homogeneity among the individual server computing devices of the data center. More specifically, and as detailed below, hardware accelerators comprising circuitry directed to network transport functionality can be added to a data center as their own individual network clients. As a result, many different hardware accelerators, capable of accelerating different specific functions, or different portions of workflows, can be added to a data center independently of the individual server computing devices, which can remain homogenous and, as a result, the data center can benefit from the advantages of homogeneity described in detail above. The workflows being executed by any one or more of the server computing devices of the data center can, thereby, have portions thereof accelerated by hardware accelerators directed to accelerating those portions, achieving increases in speed and efficiency, and, in general, optimizing the execution of such workflows.

Figure 2:
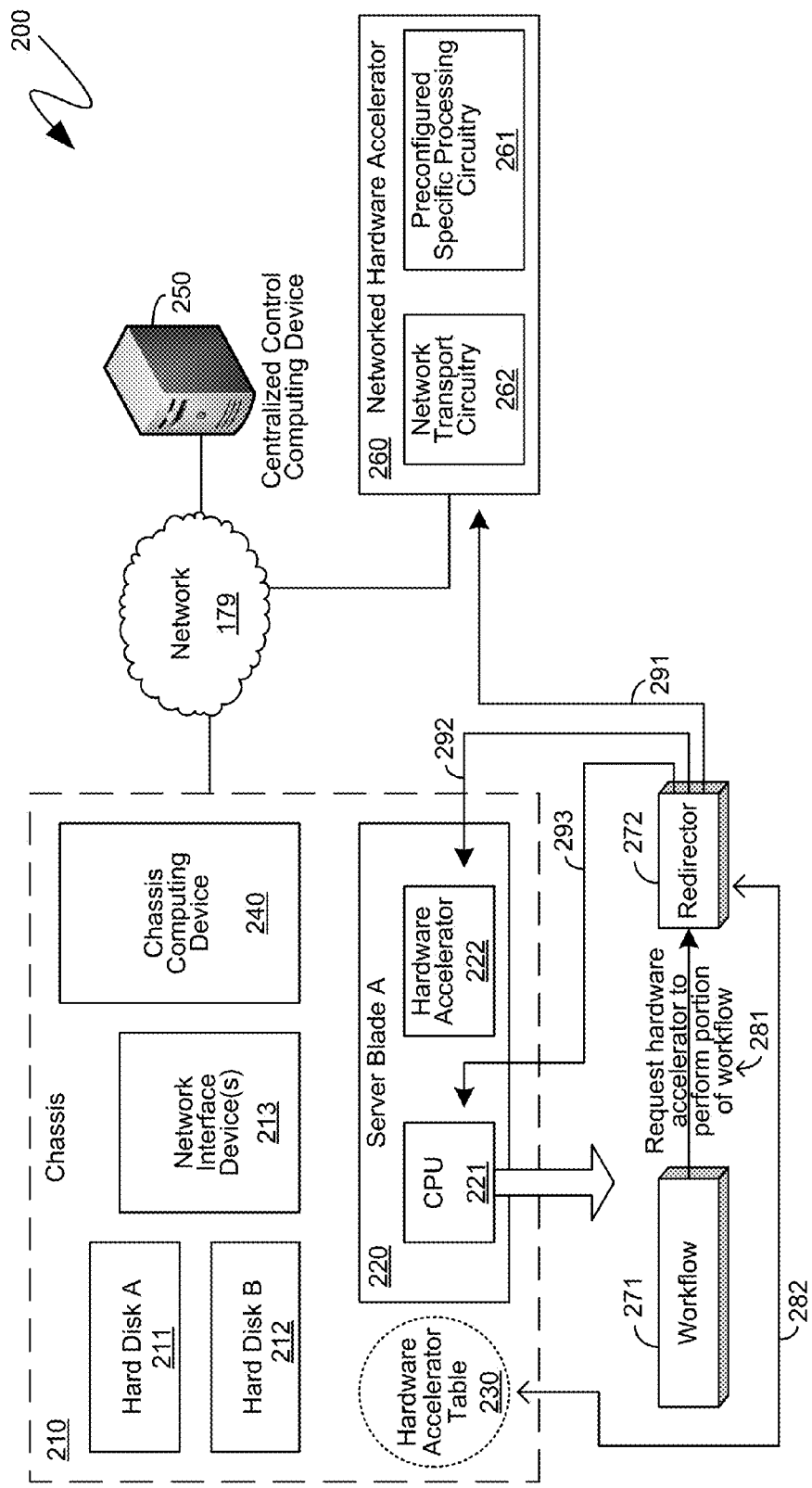
FIG. 2 is a block diagram of an exemplary system comprising an exemplary networked hardware accelerator.

Turning to FIG. 2, the exemplary system 200 shown therein illustrates a chassis, such as would typically be found in a data center, in the form of the exemplary chassis 210. For purposes of simplification, the exemplary chassis 210 is shown as comprising only one server blade, namely the exemplary server blade 220. However, as will be detailed below, a typical data center chassis can comprise multiple server blades in addition to other exemplary hardware, such as that illustrated in FIG. 2. In addition to the exemplary chassis 210, the exemplary system 200 of FIG. 2 further illustrates a separate control computing device, in the form of the exemplary centralized control computing device 250, which can be communicationally coupled to the exemplary chassis 210 through a network, such as the network 179 described above. Exemplary system 200 of FIG. 2 also illustrates an exemplary networked hardware accelerator, such as the exemplary networked hardware accelerator 260, whose structure and operation will be described in further detail below.

As illustrated by the system 200 of FIG. 2, the exemplary chassis 210 can comprise one or more server blades, such as the exemplary server blade 220. As will be recognized that those skilled in the art, server blades can be server computing devices, having componentry analogous to at least some of the componentry of the exemplary computing device 100, described in detail above and illustrated in FIG. 1, except that such server computing devices can be physically configured in the form of a "blade", or other physical arrangement in which components are spread out along two dimensions thereby facilitating stacking of multiple such server computing devices within a single chassis, such as the exemplary chassis 210. For simplicity of illustration, rather than showing each component of the server blades, FIG. 2 only illustrates the CPUs and hardware accelerators of the exemplary server blade 220, namely the CPU 221 and the hardware accelerator 222.

The exemplary chassis 210, shown in FIG. 2, can also comprise components that can be utilized by, and shared between, various server blades of the exemplary chassis 210. For example, the exemplary chassis 210 can comprise storage devices, such as the exemplary hard disks 211 and 212. Alternatively, or in addition, such storage devices can be part of the individual server blades, such as the exemplary server blade 220. The exemplary chassis 210 can also comprise network interface devices, such as the exemplary network interface device 213. As will be recognized by those skilled in the art, network interface devices can include network interface cards, routers, network cabling, switches, and other like network interface devices. According to one aspect, the chassis 210 can comprise a separate computing device, such as exemplary chassis computing device 240, that can manage the other components of the chassis, including the processing tasks assigned to various server blades of the chassis.

To provide context for the descriptions below, one or more server blades of a chassis, such as the exemplary server blade 220 of the exemplary chassis 210, can be assigned a "workflow", such as the exemplary workflow 271. As utilized herein, the term "workflow" means a sequence of computer-executable instructions that perform a computing task or result in a computed determination. Specific portions of a workflow can be performed more efficiently by a hardware accelerator than they could be performed by a generalized processor, such as the exemplary CPU 221. For example, as part of the workflow 271, a specific set of data can be compressed. That portion of the workflow 271 that is directed to compressing that data can be offloaded into a hardware accelerator and, thereby, performed more efficiently, and more quickly. Additionally, while the hardware accelerator is performing such a compression, the general purpose processing unit that was executing the workflow 271, such as the exemplary CPU 221, can be freed to perform other portions of the workflow 271, or a different workflow.

According to one aspect, a local hardware accelerator, such as the exemplary hardware accelerator 222, that is part of the server blade 220 that comprises the CPU 221 executing the workflow 271, can have been configured to perform a hardware acceleratable function such as, for example, the aforementioned compression function. In such an aspect, the portion of the workflow 271 comprising the compression of the set of data can be provided to the local hardware accelerator, such as exemplary hardware accelerator 222, for processing.

However, for commonly performed functions, such as, for example, the aforementioned compression function, it can be advantageous to utilize fixed-function hardware accelerators, such as ASICs, dedicated to performing such functions. As will be recognized by those skilled in the art, and as detailed above, such fixed-function hardware accelerators can perform functions more quickly and more efficiently than reconfigurable hardware accelerators, such as FPGAs. However, to maintain homogeneity among the server blades, local hardware accelerators, such as, for example, the hardware accelerator 222, can be reconfigurable hardware accelerators. More specifically, it can be impractical to equip each server blade with multiple fixed-function hardware accelerators directed to multiple different functions. Moreover, fixed-function accelerators can become obsolete if the workflow to which their functionality was directed changes. Returning to the above example of compression functionality, if the compression algorithm is changed so as to be more efficient, such as by using larger data block sizes, such a change can render obsolete a fixed-function accelerator. By contrast, reconfigurable accelerators can adapt and avoid obsolescence and, as such, are more likely to be utilized in situations where such hardware accelerators are a component of the server blades themselves.

According to one aspect, therefore, rather than equipping each server blade with multiple different types of hardware accelerators, contemplated networked hardware accelerators, such as the exemplary networked hardware accelerator 260, can be utilized. More specifically, and as illustrated in the system 200 of FIG. 2, the exemplary networked hardware accelerator 260 can comprise preconfigured specific processing circuitry 261 and network transport circuitry 262. The preconfigured specific processing circuitry 261 can be that portion of the network hardware accelerator 260 that can perform the processing of a predefined set of computer executable instructions that the networked hardware accelerator is configured to perform. For example, the preconfigured specific processing circuitry 261 can comprise processing circuitry preconfigured to perform the aforementioned compression. Other like functions can be performed by other networked hardware accelerators having corresponding preconfigured specific processing circuitry.

The network transport circuitry of a networked hardware accelerator, such as the exemplary network transport circuitry 262 of the exemplary networked hardware accelerator 260, can comprise circuitry capable of executing computer executable instructions that provide network transport functionality, such as a lightweight transport layer. More specifically, lightweight transport functionality can provide basic transport functionality without the attendant overhead and complexity associated with more fully functional transport functionality. For example, lightweight transport functionality can minimize buffering requirements insofar as received network packets are concerned, such as, for example, by buffering frames at a sending node until an acknowledgment is received, at the sending node, from receiving node, that the frame was received correctly. If an acknowledgement is not received within a parameterizable timeout period, the buffered frames can be retransmitted. As another example, lightweight transport functionality, such as that implemented by the exemplary network transport circuitry 262, can maintain only a minimum of communicational state so as to enable such lightweight transport functionality to be more easily implementable in hardware circuitry. In addition, the network transport security 262 can comprise a communicational connection linking the exemplary networked hardware accelerator 260 with the network 179 to which the exemplary chassis 210 is also communicationally coupled.

In such an aspect, therefore, a workflow being executed on a server blade of a chassis, such as the exemplary workflow 271 being executed on the exemplary server blade 220, can have a portion thereof executed by the network hardware accelerator 260 in a faster and more efficient manner. More specifically, the workflow 271 can make a request 281 to have a portion of the workflow 271 executed by a hardware accelerator. For example, upcoming portion of the workflow 271 can comprise the performance of a compression, which can be a function that the preconfigured specific processing circuitry 261 is configured to perform in an optimized and accelerated manner. On account of the above-described network transport circuitry 262, network communications can occur between the server blade 220 and the exemplary networked hardware accelerator 260. For example, upon receiving the request 281, processes executing on the server blade 220 can packetize relevant data and can communicate such packets across the network 179 to the networked hardware accelerator 260, such as via the capabilities of the network transport circuitry 262. The networked hardware accelerator 260, can then utilize the preconfigured specific processing circuitry 261 to perform the requested function in an accelerated manner. Once the requested processing is completed by the networked hardware accelerator 260, the networked hardware accelerator 260 can generate return communications, such as via the network transport circuitry 262, which can then be communicated, through the network 179, to the processes executing on the server blade 220. Such processes can then return a notification to the workflow 271 that the requested processing has been completed, and can, if necessary, provide any resulting data, generated by the requested processing.

The communications between a networked hardware accelerator and processes executing on, for example, a server blade can conform to the network transport implemented by the network transport security of the networked hardware accelerator. For example, the packetization performed by processes executing on the exemplary server blade 220, in order to communicate relevant data to the exemplary networked hardware accelerator 260, to enable the exemplary networked hardware accelerator 260 to accelerate a portion of the workflow 271 otherwise being executed on the exemplary server blade 220, can be a packetization in accordance with the network transport implemented by the network transport circuitry 262, with each packet comprising the relevant fields expected by the network transport circuitry 262.

According to one aspect, exemplary communications between the exemplary server blade 220 and the exemplary networked hardware accelerator 260 can be facilitated by a redirector, such as exemplary redirector 272, executing on the server blade 220, or executing on an analogous computing device, such as the chassis computing device 240 or the centralized control computing device 250. According to one aspect, the redirector 272 can make reference to a hardware accelerator table 230 to identify an appropriate hardware accelerator to accelerate that portion of the workflow 271 that is referenced by the request 281. For example, the workflow 271 can require the compression of a set of data. The computer-executable instructions that comprise the workflow 271 can have been designed to request that such a compression function be performed by a hardware accelerator, should one be available. Such computer-executable instructions can generate the request 281, which can be directed to the redirector 272.

As indicated, the redirector 272 can make reference to a hardware accelerator table, such as exemplary hardware accelerator table 230. Although nominated a "table", any data structure sufficient to contain the relevant, and below-identified, information can be utilized and, as used herein, the term "table" means any such data structure. According to one aspect, a hardware accelerator table can comprise an updated enumeration of available hardware accelerators, the functions that such hardware accelerators are capable of executing, and identifiers by which communications to such hardware accelerators can be directed. The exemplary hardware accelerator table 230 can be resident in the memory of individual server blades, such as exemplary server blade 220, it can be stored on storage media, such as the exemplary hard disks 211 and 212, or it can be remotely available, such as via the centralized control computing device 250.

Returning to the above example, where the exemplary workflow 271 issues a request 281 for a specific portion of the exemplary workflow 271, such as a compression function, to be executed by hardware accelerator, the redirector 272, upon receiving such a request 281, can reference the hardware accelerator table 230, as illustrated by the arrow 282, and can receive therefrom an indication of which hardware accelerator is capable of performing such a function. For example, the hardware accelerator table 230 can identify the networked hardware accelerator 260 as being capable of performing the compression function that the workflow 271 seeks to have hardware accelerated. The hardware accelerator table 230 can also provide an identifier, such as a network address, by which communications to the networked hardware accelerator 260 can be directed. The redirector 272, as illustrated by the arrow 291, can then packetize the relevant data, such as in the manner detailed above, and transmit to the networked hardware accelerator 260, via the network address provided by the hardware accelerator table 230. In such a manner, communications from the exemplary server blade 220 can reach the exemplary networked hardware accelerator 260 through existing networking infrastructure comprising the network 179. The network hardware accelerator can then utilize the preconfigured specific processing circuitry 261 to execute the requested function, such as the exemplary compression function referenced above. The network transport security 262 can then packetize any return data, which can then be communicated back to the processes executing on the server blade 220, such as exemplary redirector 272. For example, as part of the initial communications, by the redirector 272, to the network hardware accelerator 260, the redirector 272 can provide a network address, such as a network address of the server blade 220, by which return communications can be provided to the redirector 272 across the network 179.

In some instances, requests from the workflow 271, such as exemplary request 281, to have portions of the workflow 271 hardware accelerated, can result in those portions of the workflow 271 being directed to a local hardware accelerator, such as the exemplary hardware accelerator 222. According to one aspect, communications to a local hardware accelerator can be performed similarly to the communications to a remote hardware accelerator, such as, for example, the networked hardware accelerator 260, thereby enabling a single set of communicational functionality to communicate hardware acceleratable workflow portions to both local and remote hardware accelerators. More specifically, communications to a local hardware accelerator, such as, for example, the hardware accelerator 222 can be packetized in a manner analogous, or equivalent, to that described in detail above. By way of an illustrative example, the workflow 271 can issue a request 281 to, for example, the redirector 272 described above. While previous examples illustrated such a request 281 within the context of a request for, for example, the performance of one or more compression functions, in the present illustrative example the exemplary request 281 can be a request for the performance of a ranking algorithm, or other like functionality for which corresponding networked hardware accelerators may not be presently communicationally coupled to the exemplary network 179. Consequently, upon receiving such a request 281, such as, for example, for the performance of a ranking algorithm, the redirector 272 can reference the exemplary hardware accelerator table 230, and the exemplary hardware accelerator table 230 can identify the exemplary local hardware accelerator 222 as being configured to, for example, execute the ranking algorithm. The identification of the exemplary local hardware accelerator 222, such as can be obtained from the exemplary hardware accelerator table 230, can be a network address, analogous to the network address utilized to identify the networked hardware accelerator 260, except that the network address identifying the exemplary local hardware accelerator 222 can be local to the server blade 220. Upon obtaining such information from the hardware accelerator table 230, the redirector 272 can packetize the relevant data, such as described in detail above, and can communicate such packets to the local hardware accelerator 222, as illustrated by the arrow 292.

The communication of packetized data between the redirector 272 and the hardware accelerator 222 that is local to the server blade 220 need not necessarily travel across the network 179. For example, processes executing on the server blade 220 can implement network transport functionality for the hardware accelerator 222 such that, for example, the redirector 272 can place packetized data into a shared memory space accessible to processes executing on the server blade 220. The processes implementing the network transport functionality for the hardware accelerator 222 can then retrieve such packetized data from that shared memory space and provide it to the hardware accelerator 222. Return communications can be provided in an analogous manner. As an alternative, the hardware accelerator 222 can, itself, comprise network transport functionality analogous to, for example, the exemplary network transport circuitry 262 of the networked hardware accelerator 260.

In certain instances, the redirector 272 may not be able to accommodate the request 281 that a defined portion of the workflow 271 be hardware accelerated. For example, one or more hardware accelerators configured to optimize execution of that portion of the workflow 271 to which the request 281 is directed may already be busy executing portions of other workflows. As another example, one or more hardware accelerators configured to optimize that specific portion of the workflow 271 may have been removed or otherwise deactivated. In such instances, the redirector 272 can simply return processing of the workflow 271, including that portion to which the request 281 was directed, back to the CPU 221 that was processing other portions of the workflow 271. Such an "early exist" is graphically illustrated by the arrow 293 in FIG. 2.

As can be seen, and as will be described further below with reference to FIG. 3, a networked hardware accelerator, such as the exemplary networked hardware accelerator 260, in combination with a hardware accelerator table, such as exemplary hardware accelerator table 230, enables server computing devices of a data center, such as the exemplary server blade 220, to remain homogenous, and, thereby, interchangeable and easily replaceable, such as in the event of failure, while also facilitating the dynamic addition, or reconfiguration, of hardware accelerators, independent of the server computing devices, that can be directed to specific functions, or that can otherwise accelerate the processing of a discrete set of computer-executable instructions.

Figure 3:
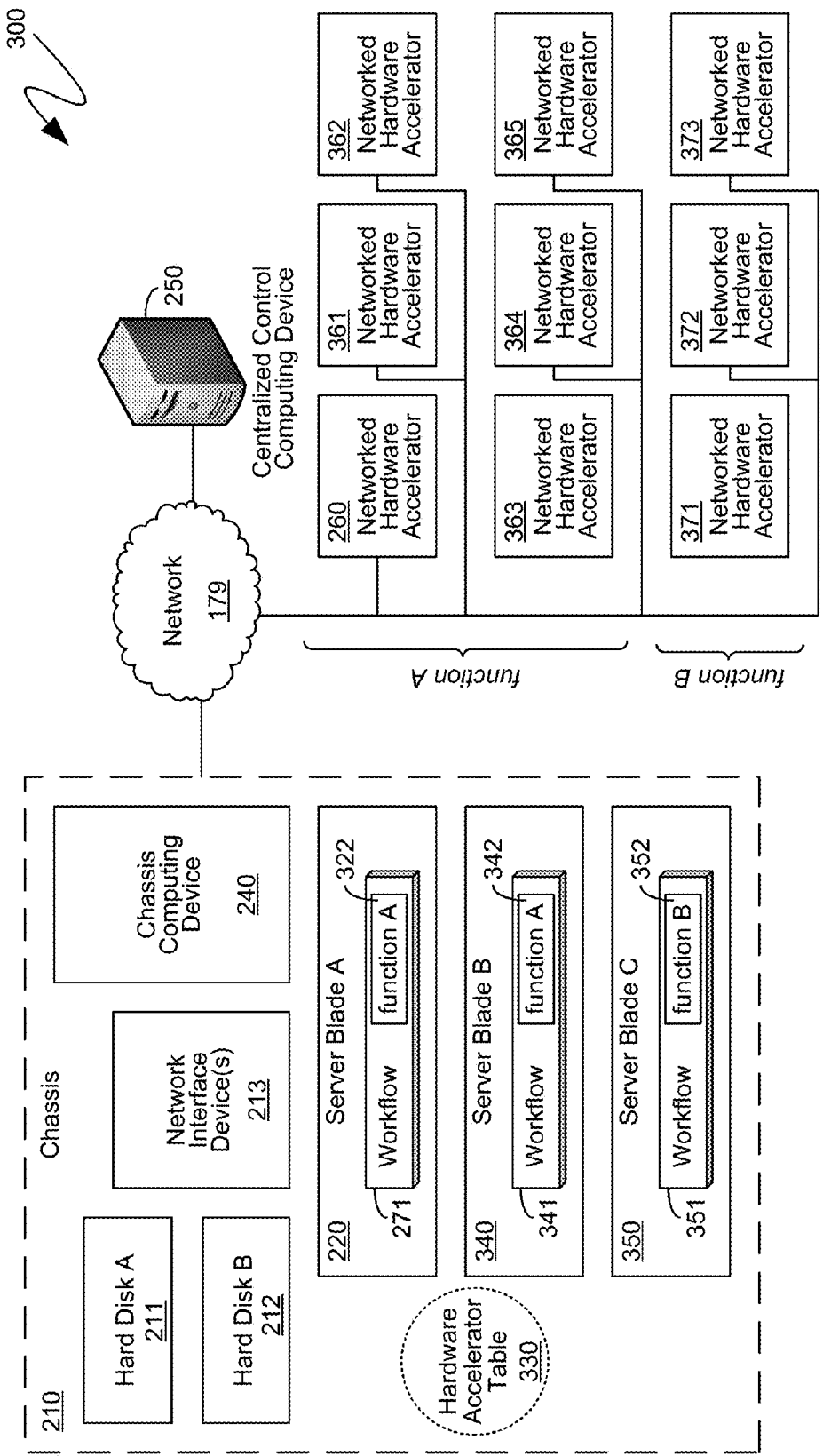
FIG. 3 is a block diagram of an exemplary expanded system comprising multiple exemplary networked hardware accelerators.

Turning to FIG. 3, the exemplary system 300 illustrates the exemplary system 200 of FIG. 2 expanded in accordance with the above descriptions. For example, exemplary chassis 210 is shown in the exemplary system 300 of FIG. 3 as comprising multiple server blade computing devices, namely the exemplary server blade computing device 220 described in detail above, and additional exemplary server blade computing devices 340 and 350. For purposes of illustration, the exemplary server blade 220 is illustrated as executing the exemplary workflow 271, referenced above, having a portion thereof that is hardware acceleratable. For purposes of illustration, the hardware acceleratable portion of the exemplary workflow 271 is illustrated as the function 322. For example, the function 322 can be a compression function or other like execution of computer-executable instructions that can be executed more quickly and more efficiently by hardware accelerators. As detailed above, a hardware accelerator table, such as the exemplary hardware accelerator table 330, can identify a networked hardware accelerator, such as the above referenced networked hardware accelerator 260, to which such processing can be offloaded and performed more quickly and more efficiently.

By way of an illustrative example, the function 322 can be a function that can be frequently performed within a data center, a function that can be easily parallelized, or combinations thereof. Consequently, a determination can be made that it would be advantageous to add additional networked hardware accelerators, analogous to the exemplary networked hardware accelerator 260, to the data center. As illustrated in the system 300 of FIG. 3, additional networked hardware accelerators designed to accelerate the performance of the function 322 such as, for example, networked hardware accelerators designed to accelerate the performance of compression functionality, can be added to the data center merely by communicationally coupling, to the network 179, each of such networked hardware accelerators, and then updating the hardware accelerator table 330 appropriately. Such flexibility and ease of adding additional hardware acceleration, without negatively impacting the homogeneity of the server blades can be facilitated by the mechanisms described herein.

For example, within the exemplary system 300 of FIG. 3, additional networked hardware accelerators, in the form of the networked hardware accelerators 361, 362, 363, 364 and 365, all directed to optimizing the execution of a specific function, such as, for example, a compression function, can be added to the data center by communicationally coupling those exemplary networked hardware accelerators 361, 362, 363, 364 and 365 to the network 179 and updating the hardware accelerator table 330 to now include the capabilities, availability, and network address information for the newly added exemplary networked hardware accelerators 361, 362, 363, 364 and 365. Subsequently, should the workflow 271, being executed by the server blade 220, seek to have the function 322 hardware accelerated, reference to the hardware accelerator table 330 can identify any one or more of the exemplary networked hardware accelerators 260, 361, 362, 363, 364 and 365 as being capable of hardware accelerating such a function 322. Thus, for example, if the function 322 is parallelizable, then multiple ones of the exemplary networked hardware accelerators 260, 361, 362, 363, 364 and 365 can receive packetized network communications to cause those networked hardware accelerators to accelerate, in parallel, the performance of the function 322.

As another example, multiple server blade computing devices can be executing workflows that can seek to have the same functionality hardware accelerated. For example, the exemplary server blade 340, which is illustrated in the exemplary system 300 of FIG. 3 as also being part of the exemplary chassis 210, can be executing a workflow 341 that can also perform a function 342 equivalent to the function 322, namely a function that is hardware acceleratable by any one or more of the exemplary networked hardware accelerators 260, 361, 362, 363, 364 and 365. In such an example, dynamic updates to a hardware accelerator table, such as exemplary hardware accelerator table 330, can provide load-balancing and otherwise enable multiple workflows, such as exemplary workflows 271 and 341, to share the hardware acceleration capabilities of the exemplary networked hardware accelerators 260, 361, 362, 363, 364 and 365. For example, the exemplary networked hardware accelerators 260, 362 and 364 can already be executing, in an accelerated manner, the function 322 that is part of the workflow 271. In such an instance, the hardware accelerator table 330 can be updated to indicate, when the workflow 341 initiates a request to have such a portion of the workflow 341, namely the exemplary function 342, hardware accelerated, that the exemplary networked hardware accelerators 260, 362 and 364 are capable of accelerating exemplary function 342, but are currently not available to do so. Conversely, the hardware accelerator table 330 can indicate the availability of the networked hardware accelerators 361, 363 and 365. Processes executing on the server blade 340 can then packetize the relevant data and communicate it to the exemplary networked hardware accelerators 361, 363 and 365, such as in the manner detailed above.

Load-balancing, such as through updates to the hardware accelerator table 330 can be performed by processes executing in any one or more the server blade computing devices, or by processes executing an independent server computing device such as, for example, the centralized control computing device 250. In addition to executing certain subsets of computer-executable instructions, the networked hardware accelerators can comprise circuitry that can provide status updates, such as to a centralized control computing device, thereby enabling the centralized control computing device to effectuate more accurate load balancing. The sort of load balancing performed can be dependent upon the function to which the networked hardware accelerators are directed. For example, networked hardware accelerators can be directed to functions that can be performed quickly such as, for example, the compression of relatively small amounts of data. In such instances, load balancing can be achieved by random assignment, round-robin assignment, or other like load-balancing techniques by which requests for processing are distributed among multiple different and independent processing units, such as the exemplary networked hardware accelerators. As another example, networked hardware accelerators can be directed to functions that can be performed over longer periods of time such as, for example, ranking algorithms directed to large data sets. In such instances, a reservation system can be utilized to maximize availability of hardware accelerators, such as the exemplary networked hardware accelerators described herein, when such hardware acceleration is required by the execution of a workflow.

The above descriptions have been directed to a single layer hardware accelerator table, where each server blade, or other like computing device executing workflows whose portions can be hardware accelerated, has equivalent accessibility to networked hardware accelerators. In an alternative arrangement, the utilization of networked hardware accelerators can comprise multiple layers more levels, thereby enabling hierarchical scheduling in utilization of such networked hardware accelerators. More specifically, in such an alternative arrangement any computing device executing a workflow, which seeks to have at least some portion of that work for hardware accelerated, can have, such as in its own version of a hardware accelerator table, an address to a higher level node. Requests for hardware acceleration cam, thereby, be directed to such a higher level node, which can then distribute such requests among networked hardware accelerators known to such a higher level node, such as by being identified in its hardware accelerator table.

Hierarchically, the hardware accelerator table of such a higher level node can, itself, contain information and addresses identifying still higher level nodes. However, from the perspective of an originally requesting node, such as, for example, the exemplary server blade 220, processes executing on such an exemplary server blade 220 only need know the address of a next higher level node in the processing pipeline. For example, such an entry can be contained in the hardware accelerator table accessible by the exemplary server blade 220. The remaining nodes involved in the processing do not need to be tracked or monitored by processes executing on the exemplary server blade 220.

Additionally, not every request for hardware acceleration is required to be handled by a redirector, such as the exemplary redirector 272. More specifically, lower-level nodes can direct all requests for hardware acceleration to a higher level node, from which such requests can be distributed and load balanced among available networked hardware accelerators. Consequently, while such lower level nodes need not implement a redirector, such higher-level nodes can implement a redirector, such as in the manner described in detail above.

To further illustrate the reconfigurable aspects of the mechanisms described herein, by way of an example, a determination can be made that a function 352 is increasingly being performed by workflows being executed by the server blades of an exemplary data center. Such an exemplary function 352 can be, for example, a ranking function, a sorting function, image processing function, or other like functionality that can be hardware acceleratable. Indeed, the function 352 may have been hardware accelerated by local hardware accelerators, such as those detailed above. For purposes of the present, illustrative example, however, a determination can be made that it can be advantageous to expand the data center to include fixed-function hardware accelerators, such as ASICs, to perform such a function. Consequently, such an exemplary data center can be easily expanded by adding additional networked hardware accelerators, directed to such a function 352, merely by communicationally coupling such additional networked hardware accelerators such as, for example, the exemplary networked hardware accelerators 371, 372 and 373, to the exemplary network 179, and then correspondingly updating the hardware accelerator table 330. Subsequently, when a server blade computing device, such as the exemplary server blade 350, executes a workflow, such as exemplary workflow 351, that seeks to have the function 352 hardware accelerated, the execution of the exemplary workflow 351 can comprise a request to have the exemplary function 352 hardware accelerated, such a request can trigger, as detailed above, reference to the hardware accelerator table 330, that can identify, such as via network address, the exemplary networked hardware accelerators 371, 372 and 373 as being available to hardware accelerate the exemplary function 352. In such a manner, hardware accelerators available to hardware accelerate portions of workflows being executed by the server computing devices of a data center can be dynamically added, changed or removed without changing the servers of a data center, and while enabling the data center to utilize homogenous server hardware.

As another example, if the networked hardware accelerators are reconfigurable hardware accelerators such as, for example, FPGAs themselves, then the networked hardware accelerators can be reconfigured to perform different computing functions and the physical networked hardware accelerators need not be removed and replaced. By way of an illustrative example, if increasing usage is detected of the function which the networked hardware accelerators 371, 372 and 373 are configured to perform, while concurrently decreasing usage is detected of the function which the networked hardware accelerators 260, 361, 362, 363, 364 and 365 are configured to perform, then at least some of the networked hardware accelerators 260, 361, 362, 363, 364 and 365 can be reconfigured to perform the same function as the networked hardware accelerators 371, 372 and 373. As before, hardware accelerator tables, such as the exemplary hardware accelerator table 330, can be updated to reflect the change in the functionality which the hardware accelerators at given specific network addresses are configured to perform.

Figure 4:
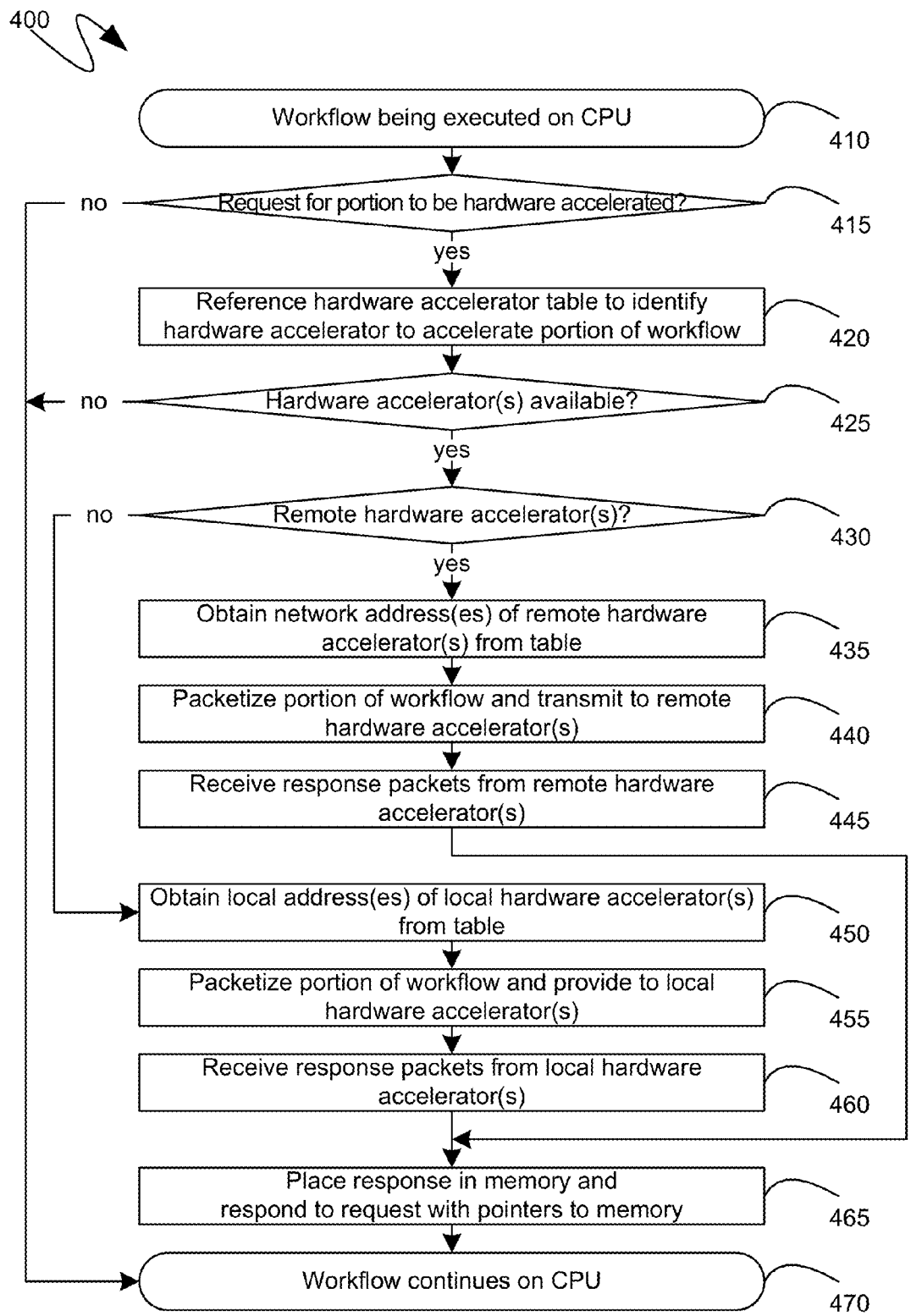
FIG. 4 is a flow diagram of an exemplary utilization of networked hardware accelerators.

Turning to FIG. 4, the exemplary flow diagram 400 shown therein illustrates an exemplary series of steps by which networked hardware accelerators can be utilized by workflows being executed by one or more server computing devices. The relevant processing can commence with the execution of a workflow on a generalized processing unit, such as a CPU, as illustrated by step 410 in FIG. 4. Subsequently, at step 415, a determination can be made as to whether at least a portion of that workflow is able to be accelerated by the hardware accelerators that are available. As indicated previously, hardware accelerators can be optimized for specific processing functionality, such as for the performance of specific computer-executable instructions for specific tasks. Consequently, in the performance of step 415, an analysis can be undertaken of whether at least a portion of the workflow being executed performs such tasks. Alternatively, step 415 can encompass the receipt of calls to specific application program interfaces by which portions, of the workflow being executed, can request their execution on hardware accelerators. If there are no portions of the workflow that are able to be accelerated, or if no request for hardware acceleration is received from the execution of such a workflow then the workflow can continue to be executed on the CPU, as indicated by step 470.

If, however, at step 415, it is determined that at least a portion of the workflow can be accelerated by being executed on one or more hardware accelerators, such as by receiving, at step 415, a request for a portion of the workflow to be accelerated by a hardware accelerator, a hardware accelerator table can be referenced, at step 420, to identify one or more hardware accelerators designed to accelerate the portion of the workflow referenced at step 415. As a threshold determination, at step 425, a determination can be made, from the reference to the hardware accelerator table at step 420, as to whether any hardware accelerators capable of accelerating a portion of the workflow referenced at step 415 are, actually, available to perform such a hardware acceleration. If, at step 425, it is determined that no such hardware accelerators are available, then processing can return to step 470 and the workflow can continue to be executed on the CPU, including the portion that could have been hardware accelerated, but for the lack of availability of appropriate hardware accelerators, as determined at step 425, in view of the information obtained from the hardware accelerator table referenced at step 420.

At step 430, a subsequent determination can be made as to whether the hardware accelerator identified by reference to the hardware accelerator table at step 420, is local to the execution of the workflow, or is a remote, networked hardware accelerator. If, at step 430, it is determined that the hardware accelerator is a remote, networked hardware accelerator, then processing can proceed with step 435, and the network address of the remote hardware accelerator can be obtained from the hardware accelerator table that was referenced at step 420. Subsequently, at step 440, the relevant data to accelerate that portion of the workflow can be packetized, such as in accordance with the lightweight transport mechanisms implemented by such a remote hardware accelerator, and those packets can be transported to the remote hardware accelerator over a network based upon a network address obtained at step 435. Subsequent to the completion of the processing of the portion of the workflow by the remote hardware accelerator, response packets can be received, such as at step 445. According to one aspect, the data contained in such response packets can be placed into memory, as indicated at step 465, and pointers to such data can be returned to the workflow, whose processing can then continue at step 470.

If, at step 430, a determination is made that the identified hardware accelerator is a local hardware accelerator then, as indicated previously, according to one aspect, local addresses of such a local hardware accelerator can be obtained, at step 450, from the hardware accelerator table. Subsequently, at step 455, the acceleratable portion of the workflow can be packetized, such as in a manner analogous to that performed at step 440, and the packets can be provided to the local hardware accelerator, such as by being stored in a shared memory location, or such as by being communicated through networkable connections. As before, response packets can be received from the local hardware accelerator, at step 460, signifying the completion of the accelerated processing of that portion of the workflow by the local hardware accelerator. Appropriate data can then be placed into memory, at step 465, as described, and the processing of the workflow can continue on the CPU at step 470.

The descriptions above include, as a first example, a system comprising: a server computing device comprising: one or more generalized central processing units; a first network interface communicationally coupling the server computing device to a network as a first node of the network; and one or more computer-readable media comprising computer-executable instructions, which, when executed by the one or more generalized central processing units, cause the server computing device to: receive a request for a portion of a workflow to be performed by a hardware accelerator, the workflow being executed by the one or more generalized central processing units of the server computing device; identifying a specific hardware accelerator to which to direct the portion of the workflow based at least on pre-configured capabilities of accessible hardware accelerators; packetizing the portion of the workflow; and transmitting the packetized portion of the workflow to the identified hardware accelerator; and a first hardware accelerator that is physically and logically separate from any server computing device of the system, the first hardware accelerator comprising: processing circuitry pre-configured to perform a discrete set of computing operations more efficiently than the one or more generalized central processing units; and network transport circuitry communicationally coupling the first hardware accelerator to the network as a second node of the network, the second node being different and independent of the first node.

A second example is the system of the first example, wherein the computer-executable instructions directed to the identifying the specific hardware accelerator comprise computer-executable instructions for referencing a hardware accelerator table comprising identifications of hardware accelerators of the system and which discrete sets of computing operations they are pre-configured to perform.

A third example is the system of the second example, further comprising a centralized control computing device separate from the server computing device, the centralized control computing device comprising: one or more generalized central processing units; a second network interface communicationally coupling the centralized control computing device to the network as a third node of the network; and one or more computer-readable media comprising computer-executable instructions, which, when executed by the one or more generalized central processing units, cause the centralized control computing device to update the hardware accelerator table.

A fourth example is the system of the second example, wherein the hardware accelerator table comprises a network address for the first hardware accelerator, the network address uniquely identifying the second node.

A fifth example is the system of the second example, wherein the hardware accelerator table comprises an availability indication for the first hardware accelerator specifying whether the first hardware accelerator is busy or available.

A sixth example is the system of the fifth example, further comprising a second hardware accelerator that is physically and logically separate from any server computing device of the system, the second hardware accelerator comprising: processing circuitry pre-configured to perform the discrete set of computing operations more efficiently than the one or more generalized central processing units; network transport circuitry communicationally coupling the second hardware accelerator to the network as a third node of the network, the third node being different and independent of the first and second nodes; wherein the computer-executable instructions directed to the identifying the specific hardware accelerator comprise computer-executable instructions for load balancing the request between the first and second hardware accelerators in accordance with availability indications for the first and second hardware accelerators in a hardware accelerator table.

A seventh example is the system of the sixth example, wherein the load balancing is based on random assignments of requests to available hardware accelerators.

An eighth example is the system of the sixth example, wherein the load balancing is based on scheduled assignments of requests to available hardware accelerators.

A ninth example is the system of the first example, wherein the network transport circuitry implements a lightweight network transport functionality with reduced buffering requirements as compared with other network transport functionality utilized over the network.

A tenth example is the system of the ninth example, wherein the computer-executable instructions directed to the packetizing the portion of the workflow comprise computer-executable instructions for generating packets in accordance with the lightweight network transport functionality.

An eleventh example is the system of the tenth example, wherein the first hardware accelerator is a fixed-function device, the processing circuitry being fixed to performing only the discrete set of computing operations.

A twelfth example is the system of the first example, wherein the computer-executable instructions directed to the transmitting the packetized portion of the workflow to the identified hardware accelerator comprise computer-executable instructions for transmitting the packetized portion of the workflow to the identified hardware accelerator through the first network interface if the identified hardware accelerator is the first hardware accelerator.

A thirteenth example is the system of the first example, wherein the computer-executable instructions directed to the transmitting the packetized portion of the workflow to the identified hardware accelerator comprise computer-executable instructions for placing the packetized portion of the workflow in a shared memory of the server computing device if the identified hardware accelerator is a local hardware accelerator; and wherein further the server computing device further comprises the shared memory and the local hardware accelerator.

A fourteenth example is a method of adding hardware accelerators to a system comprising multiple computing devices communicationally coupled to a network, the method comprising: communicationally coupling a first hardware accelerator, that is physically and logically separate from any of the multiple computing device of the system, to the network, wherein the first hardware accelerator comprises: processing circuitry pre-configured to perform a first discrete set of computing operations more efficiently than one or more generalized central processing unit of the multiple computing devices; and network transport circuitry communicationally coupling the first hardware accelerator to the network as a node of the network; and modifying a hardware accelerator table, comprising identifications of hardware accelerators of the system and which discrete sets of computing operations they are pre-configured to perform, to include an identification of the first hardware accelerator and an indication of the first discrete set of computing operations, the hardware acceleration table being accessible to each of the multiple computing devices.

A fifteenth example is the method of the fourteenth example, wherein the modifying the hardware accelerator table further comprises modifying the hardware accelerator table to include a network address uniquely identifying the first hardware accelerator on the network.

A sixteenth example is the method of the fourteenth example, further comprising load balancing between the first hardware accelerator and other hardware accelerators of the system that are also configured to perform the first discrete set of computing operations by modifying the hardware accelerator table to change an indication of whether the first hardware accelerator is busy or available.

A seventeenth example is the method of the fourteenth example, wherein the network transport circuitry implements a lightweight network transport functionality with reduced buffering requirements as compared with other network transport functionality utilized over the network.

An eighteenth example is a hardware accelerator comprising: processing circuitry pre-configured to perform a discrete set of computing operations more efficiently than generalized central processing units; and network transport circuitry communicationally coupling the first hardware accelerator to the network as a second node of the network, the second node being different and independent of the first node.

A nineteenth example is the hardware accelerator of the eighteenth example, wherein the network transport circuitry implements a lightweight network transport functionality with reduced buffering requirements as compared with other network transport functionality utilized over a network to which the hardware accelerator is communicationally coupled.

A twentieth example is the hardware accelerator of the eighteenth example, wherein the hardware accelerator is a fixed-function device, the processing circuitry being fixed to performing only the discrete set of computing operations.

As can be seen from the above descriptions, mechanisms for dynamically modifying the presence and quantity of hardware accelerators in a data center have been presented. In view of the many possible variations of the subject matter described herein, we claim as our invention all such embodiments as may come within the scope of the following claims and equivalents thereto.

We claim:

1. A system comprising:
a server computing device comprising:
one or more generalized central processing units;
a first network interface communicationally coupling the server computing device to a network as a first node of the network;
a local hardware accelerator that is logically separate from the server computing device and which is communicationally coupled to the network as a third node of the network, different from the first node; and
one or more computer-readable media comprising computer-executable instructions, which, when executed by the one or more generalized central processing units, cause the server computing device to:
receive a request for a portion of a workflow to be performed by a hardware accelerator, the workflow being executed by the one or more generalized central processing units of the server computing device;
selecting either the local hardware accelerator or one or more external hardware accelerators to which to direct the portion of the workflow based at least on pre-configured capabilities of the local hardware accelerator or the external hardware accelerators;
packetizing the portion of the workflow; and
transmitting the packetized portion of the workflow to the selected hardware accelerator; and
a first external hardware accelerator that is physically and logically separate from any server computing device of the system, the first external hardware accelerator comprising:
processing circuitry pre-configured to perform a discrete set of computing operations more efficiently than the one or more generalized central processing units; and
network transport circuitry communicationally coupling the first external hardware accelerator to the network as a second node of the network, the second node being different and independent of the first node;
wherein the transmitting the packetized portion of the workflow to the selected hardware accelerator comprises: placing the packetized portion of the workflow in a shared memory of the server computing device if the selected hardware accelerator is the local hardware accelerator and transmitting the packetized portion of the workflow to the selected hardware accelerator through the first network interface if the selected hardware accelerator is the first external hardware accelerator.

2. The system of claim 1, wherein the computer-executable instructions directed to the selecting the hardware accelerator comprise computer-executable instructions for referencing a hardware accelerator table comprising identifications of hardware accelerators of the system and which discrete sets of computing operations they are pre-configured to perform.

3. The system of claim 2, further comprising a centralized control computing device separate from the server computing device, the centralized control computing device comprising:
one or more generalized central processing units;
a second network interface communicationally coupling the centralized control computing device to the network as a fourth node of the network; and
one or more computer-readable media comprising computer-executable instructions, which, when executed by the one or more generalized central processing units, cause the centralized control computing device to update the hardware accelerator table.

4. The system of claim 2, wherein the hardware accelerator table comprises a network address for the first external hardware accelerator, the network address uniquely identifying the second node.

5. The system of claim 2, wherein the hardware accelerator table comprises an availability indication for the first external hardware accelerator specifying whether the first external hardware accelerator is busy or available.

6. The system of claim 1,
wherein the computer-executable instructions directed to the selecting the one or more external hardware accelerators comprise computer-executable instructions for load balancing the request between multiple external hardware accelerators in accordance with availability indications for the multiple external hardware accelerators in a hardware accelerator table.

7. The system of claim 6, wherein the load balancing is based on random assignments of requests to available hardware accelerators.

8. The system of claim 6, wherein the load balancing is based on scheduled assignments of requests to available hardware accelerators.

9. The system of claim 1, wherein the network transport circuitry implements a lightweight network transport functionality with reduced buffering requirements as compared with other network transport functionality utilized over the network.

10. The system of claim 9, wherein the computer-executable instructions directed to the packetizing the portion of the workflow comprise computer-executable instructions for generating packets in accordance with the lightweight network transport functionality.

11. The system of claim 10, wherein the first external hardware accelerator is a fixed-function device, the processing circuitry being fixed to performing only the discrete set of computing operations.

12. The system of claim 1, wherein one of the one or more external hardware accelerators is physically part of another, different server computing device and is coupled to the network through a fourth node, the other, different server computing device being coupled to the network through a fifth node differing from the fourth node; and wherein further the transmitting the packetized portion of the workflow to the selected hardware accelerator comprises transmitting the packetized portion of the workflow to the fourth node.

13. The system of claim 2, wherein the hardware accelerator table comprises a network address for the local hardware accelerator, the network address uniquely identifying the third node.

14. A method of adding hardware accelerators to a system comprising multiple computing devices communicationally coupled to a network, the method comprising:
communicationally coupling a first external hardware accelerator, that is physically and logically separate from any of the multiple computing device of the system, to the network, wherein the first external hardware accelerator comprises:
processing circuitry pre-configured to perform a first discrete set of computing operations more efficiently than one or more generalized central processing unit of the multiple computing devices; and
network transport circuitry communicationally coupling the first external hardware accelerator to the network as a first node of the network; and
modifying a hardware accelerator table, comprising identifications of hardware accelerators of the system and which discrete sets of computing operations they are pre-configured to perform, to include an identification of the first external hardware accelerator and an indication of the first discrete set of computing operations, the hardware acceleration table being accessible to each of the multiple computing devices;
wherein the hardware accelerator table further includes an identification of a first local hardware accelerator that is physically integrated with a first one of the multiple computing devices but is communicationally coupled to the network as a second node, the first one of the multiple computing device being communicationally coupled to the network as a third node.

15. The method of claim 14, wherein the modifying the hardware accelerator table further comprises modifying the hardware accelerator table to include a network address uniquely identifying the first external hardware accelerator on the network.

16. The method of claim 14, further comprising load balancing between the first external hardware accelerator and other hardware accelerators of the system that are also configured to perform the first discrete set of computing operations by modifying the hardware accelerator table to change an indication of whether the first external hardware accelerator is busy or available.

17. The method of claim 14, wherein the network transport circuitry implements a lightweight network transport functionality with reduced buffering requirements as compared with other network transport functionality utilized over the network.

18. A system comprising:
a first server computing device comprising:
a first set of one or more generalized central processing units;
a first network interface communicationally coupling the first server computing device to a network as a first node of the network;
a first local hardware accelerator that is logically separate from the first server computing device and which is communicationally coupled to the network as a second node of the network;
a first external hardware accelerator that is physically and logically separate from any server computing device of the system, the first external hardware accelerator comprising:
processing circuitry pre-configured to perform a discrete set of computing operations more efficiently than the one or more generalized central processing units; and
network transport circuitry communicationally coupling the first external hardware accelerator to the network as a third node of the network; and
a second server computing device comprising:
a second set of one or more generalized central processing units;
a second network interface communicationally coupling the second server computing device to a network as the third node of the network; and
one or more computer-readable media comprising computer-executable instructions, which, when executed by at least some of the second set of one or more generalized central processing units, cause the second server computing device to:
receive a request for a portion of a workflow to be performed by a hardware accelerator, the workflow being executed by at least some of the second set of one or more generalized central processing units of the second server computing device;
packetizing the portion of the workflow; and
transmitting the packetized portion of the workflow over the network, either to the second node of the network if the first local hardware accelerator was selected, or to the third node of the network if the first external hardware accelerator was selected.

19. The system of claim 18, wherein the computer-readable media of the second server computing device comprise further computer-executable instructions, which, when executed by at least some of the second set of one or more generalized central processing units, cause the second server computing device to: select either the first local hardware accelerator or the first external hardware accelerators based at least on pre-configured capabilities of the first local hardware accelerator and the first external hardware accelerator as indicated in a hardware accelerator table.

20. The system of claim 19, further comprising a centralized control computing device separate from the first and second server computing devices, the centralized control computing device comprising:
- a third set of one or more generalized central processing units; and
- one or more computer-readable media comprising computer-executable instructions, which, when executed by at least some of the third set of one or more generalized central processing units, cause the centralized control computing device to update the hardware accelerator table.

* * * * *